US010483820B2

(12) United States Patent
Luo et al.

(10) Patent No.: US 10,483,820 B2
(45) Date of Patent: Nov. 19, 2019

(54) METHOD OF ENCAPSULATING INDUCTION MOTOR STATOR

(71) Applicant: Shanghai XPT Technology Limited, Shanghai (CN)

(72) Inventors: Miao Luo, Zhongshan (CN); Jifei Ma, Tianmen (CN); Kangjun Luo, Zhongshan (CN); Zhaofeng Li, Gongyi (CN); Bohan Yang, Hanzhong (CN)

(73) Assignee: Shanghai XPT Technology Limited, Shanghai (CN)

( * ) Notice: Subject to any disclaimer, the term of this patent is extended or adjusted under 35 U.S.C. 154(b) by 66 days.

(21) Appl. No.: 15/992,156

(22) Filed: May 29, 2018

(65) Prior Publication Data

US 2019/0058369 A1 Feb. 21, 2019

(30) Foreign Application Priority Data

Aug. 18, 2017 (CN) .......................... 2017 1 0711567
Aug. 18, 2017 (CN) ..................... 2017 2 1038036 U

(51) Int. Cl.

*H02K 5/08* (2006.01)
*H02K 1/12* (2006.01)
*H02K 3/30* (2006.01)
*H02K 15/12* (2006.01)
*H02K 3/32* (2006.01)

(52) U.S. Cl.

CPC ................ *H02K 5/08* (2013.01); *H02K 1/12* (2013.01); *H02K 3/30* (2013.01); *H02K 3/32* (2013.01); *H02K 15/12* (2013.01)

(58) Field of Classification Search

CPC .. H02K 1/12; H02K 3/30; H02K 3/32; H02K 5/08; H02K 15/12
USPC .......................................................... 310/179
See application file for complete search history.

(56) References Cited

U.S. PATENT DOCUMENTS 2,836,744 A * 5/1958 Clawson .................. H02K 3/32 310/208
3,544,240 A * 12/1970 Rundell ................ F25B 31/023 417/415
4,009,306 A * 2/1977 Yamashita ............ H01F 27/327 427/374.4
4,362,490 A * 12/1982 Machida ................ H02K 15/12 249/95
4,616,407 A * 10/1986 Tamaki .................... H02K 3/38 29/596
6,075,304 A * 6/2000 Nakatsuka ............. H02K 3/345 29/596
6,914,352 B2 * 7/2005 Hoppe ..................... H02K 5/20 310/12.29

(Continued)

*Primary Examiner* — Alex W Mok
(74) *Attorney, Agent, or Firm* — Winston Hsu

(57) ABSTRACT

An induction motor stator encapsulate method, including arranging a stator of an induction motor in a case of the induction motor, wherein the stator comprises a stator core and a stator winding surrounding the stator core; filling a first encapsulating material into the case for forming a first insulation layer, wherein the first insulation layer directly covers the stator winding; and filling a second encapsulating material into the case for forming a second insulation layer, wherein the second insulation layer covers the first insulation layer; wherein a shrink rate of the first encapsulating material is smaller than a shrink rate of the second encapsulating material.

9 Claims, 7 Drawing Sheets

(56) References Cited

U.S. PATENT DOCUMENTS

| | | | | |
|---|---|---|---|---|
| 2005/0201520 | A1* | 9/2005 | Smith | H01J 35/101 378/131 |
| 2009/0015094 | A1* | 1/2009 | Yoshitake | H02K 3/34 310/257 |
| 2012/0025646 | A1* | 2/2012 | Sheeran | H02K 3/30 310/88 |
| 2012/0139387 | A1* | 6/2012 | Hung | H02K 1/187 310/216.137 |
| 2012/0183680 | A1* | 7/2012 | Chou | H02K 5/10 427/104 |
| 2012/0269666 | A1* | 10/2012 | Lin | H02K 1/04 417/423.7 |
| 2014/0300239 | A1* | 10/2014 | Takizawa | H02K 3/12 310/208 |
| 2015/0229192 | A1* | 8/2015 | Yoshida | H02K 5/08 310/43 |
| 2016/0087502 | A1* | 3/2016 | Rumbaugh | H02K 3/44 310/71 |

* cited by examiner

METHOD OF ENCAPSULATING INDUCTION MOTOR STATOR

BACKGROUND OF THE INVENTION

1. Field of the Invention

The present invention relates to an induction motor stator encapsulate method, and more particularly, an induction motor stator encapsulate method for improving the thermal dissipation effect and the strength of encapsulation structure.

2. Description of the Prior Art

A conventional method of induction motor stator encapsulate is to cover a stator winding with an encapsulating material for forming an insulation layer, which may protect the stator winding and keep the conducting parts of the stator winding to be insulated from a stator core. Therefore, the induction motor stator may perform proper function. However, the insulated layer tends to crack and fall off during the operation of the induction motor, where fragments of the insulation layer may contact with the rotor during high speed operation and lead the induction motor breakdown. Therefore, the conventional method of the induction motor stator encapsulate may not perform well, and may shorten the lifespan of the induction motor.

SUMMARY OF THE INVENTION

The present invention provides an induction motor stator encapsulate method, including arranging a stator of an induction motor in a case of the induction motor, wherein the stator comprises a stator core and a stator winding surrounding the stator core; filling a first encapsulating material into the case for forming a first insulation layer, wherein the first insulation layer directly covers the stator winding; and filling a second encapsulating material into the case for forming a second insulation layer, wherein the second insulation layer covers the first insulation layer; wherein a shrink rate of the first encapsulating material is smaller than a shrink rate of the second encapsulating material.

The present invention further provides an induction motor stator encapsulation structure, including a case; a stator, arranged in the case, the stator including a stator core; and a stator winding surrounding the stator core; a first insulation layer, formed by a first encapsulating material and directly covering the stator winding; and a second insulation layer, formed by a second encapsulating material and covering the first insulation layer; wherein a shrink rate of the first encapsulating material is smaller than a shrink rate of the second encapsulating material.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
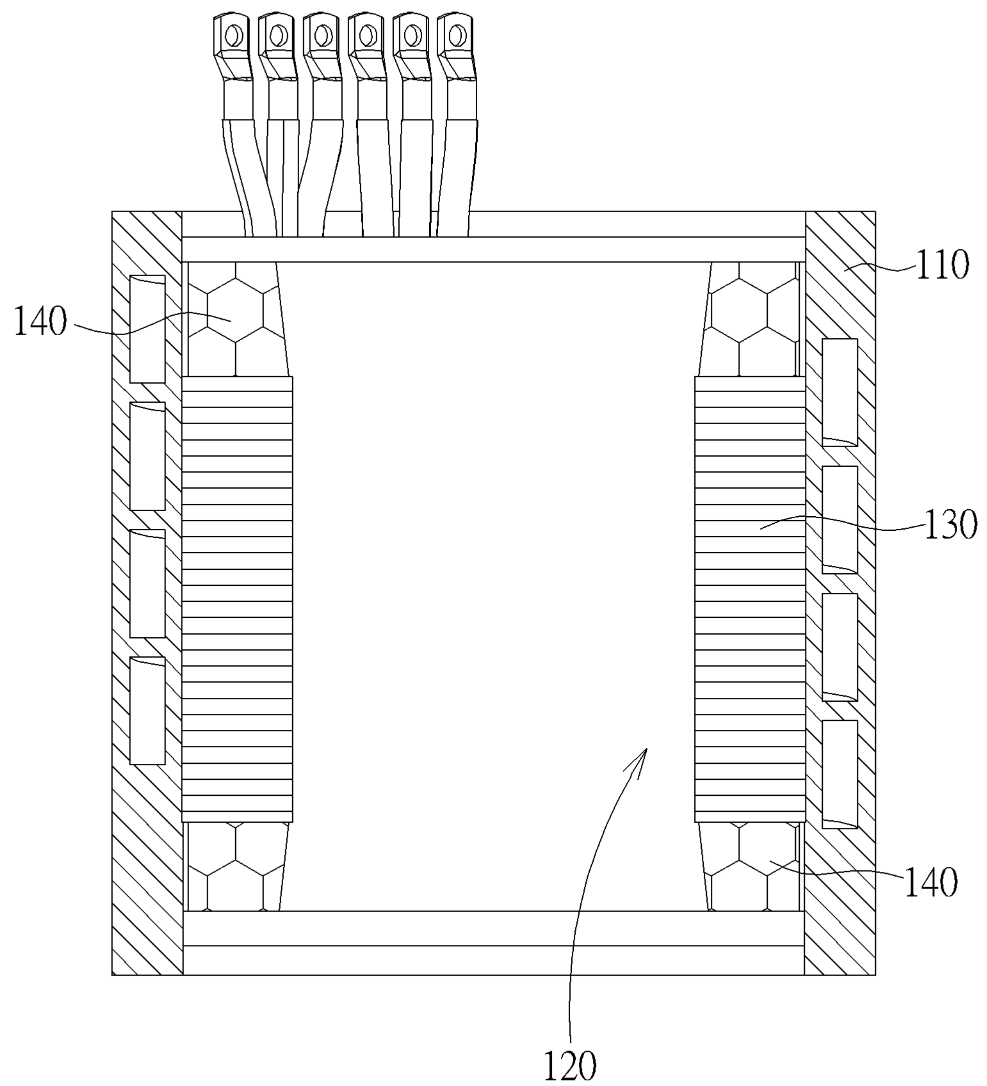
FIG. 1 illustrates an induction motor stator before encapsulating according to one embodiment of the present invention.

FIG. 1 illustrates an induction motor stator before encapsulating according to one embodiment of the present invention. As shown, the induction motor stator 120 includes a stator core 130 and a stator winding 140, which surrounds the stator core 130. When the induction motor stator 120 is arranged in a case 110 of the induction motor, the induction motor stator encapsulate method may encapsulate the induction motor stator 120.

Figure 2:
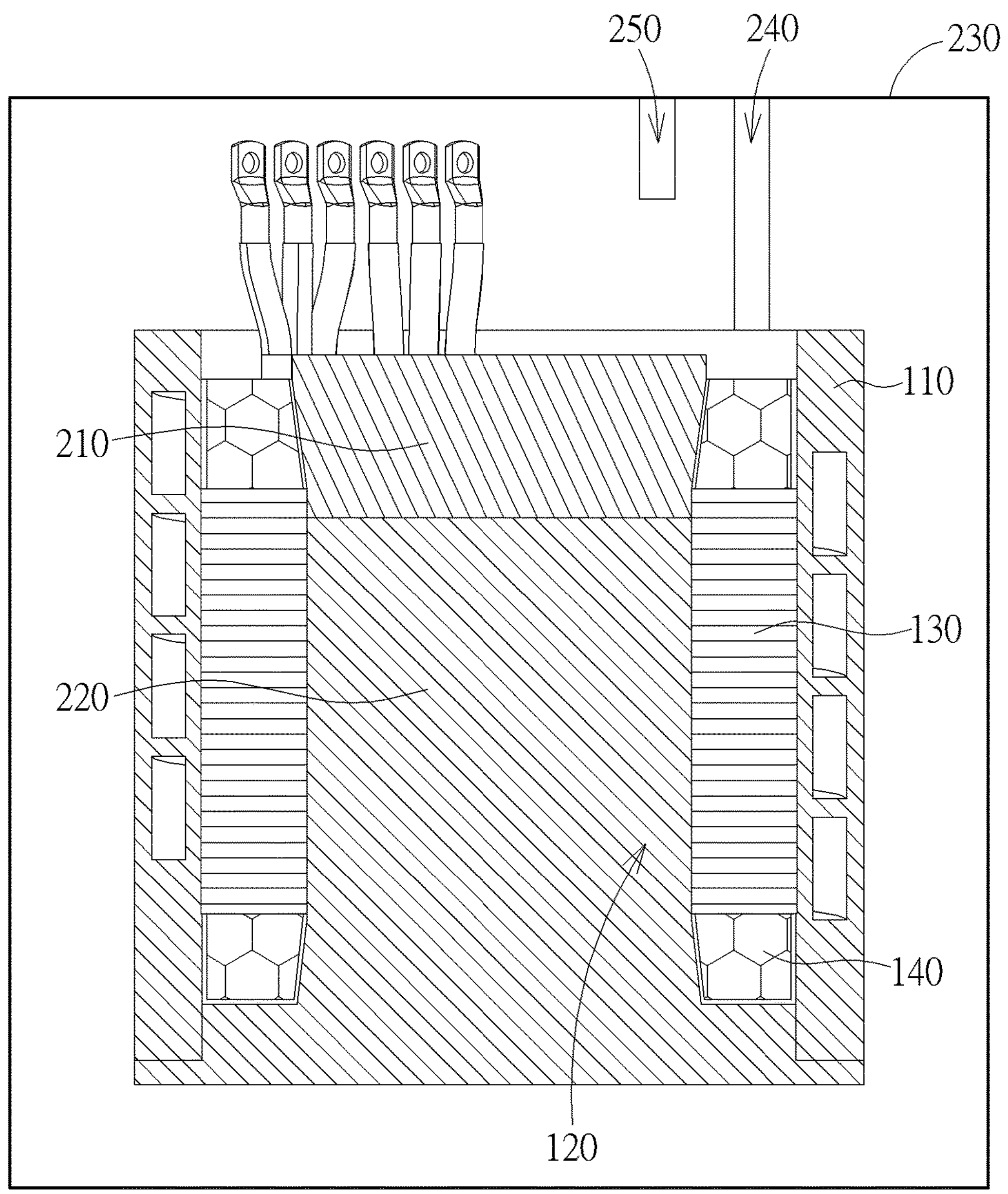
FIG. 2 illustrates a motor stator before covering a first insulation layer by the induction motor stator encapsulate method according to one embodiment of the present invention.
Figure 3:
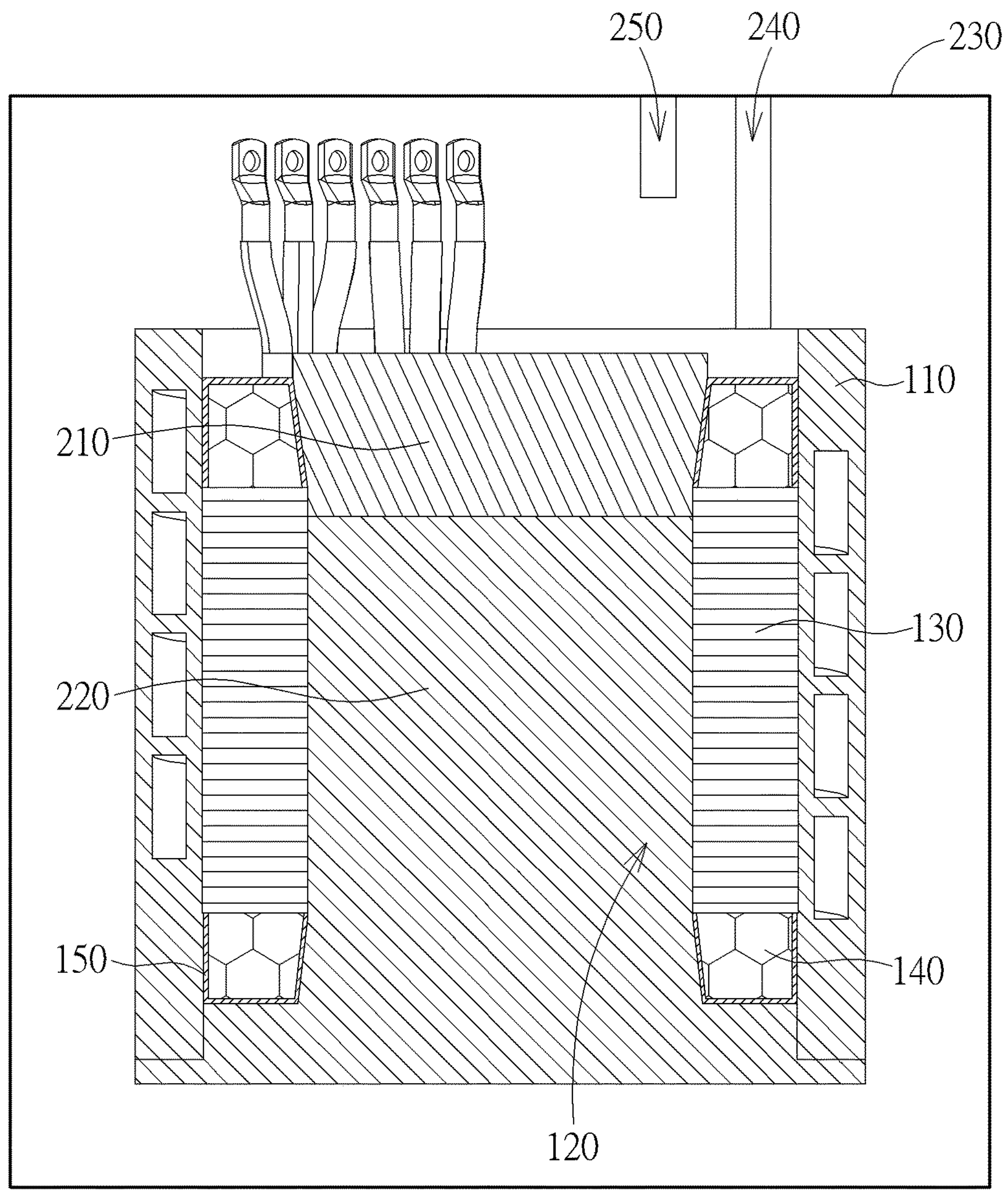
FIG. 3 illustrates a motor stator after covering a first insulation layer by the induction motor stator encapsulate method according to one embodiment of the present invention.

FIG. 2 illustrates a motor stator before covering a first insulation layer by the induction motor stator encapsulate method according to one embodiment of the present invention, and FIG. 3 illustrates a motor stator after covering a first insulation layer by the induction motor stator encapsulate method according to one embodiment of the present invention. As shown, a first top encapsulation mould 210 and a first bottom encapsulation mould 220 are arranged in the stator 120 according to the induction motor stator encapsulate method of the present invention. Then, the stator 120, the case 110, the first top encapsulation mould 210 and the first bottom encapsulation mould 220 will be put in a sealed container 230, which has a filling hole 240 and a pumping hole 250. The filling hole 240 is connected to an encapsulating material filling device (which is not illustrated in the figure), and the pumping hole 250 is connected to a vacuum pumping system (which is not illustrated in the figure). The induction motor stator encapsulate method of the present invention initiates the vacuum pumping system first to pump the sealed container 230 to a vacuum condition through the pumping hole 250. Then, the encapsulating material filling device fills a first encapsulating material into the case 110 through the filling hole 240 of the sealed container 230. After the first encapsulating material is filled into the case 110, the first encapsulating material will be moulded by the first top encapsulation mould 210 and the first bottom encapsulation mould 220. The moulded encapsulating material directly covers on the stator winding 140 and therefore forms a first insulation layer 150 directly covering on the stator winding 140. Then, according to the induction motor stator encapsulate method of the present invention, the stator 120, the case 110, the first top encapsulation mould 210 and the first bottom encapsulation mould 220 are taken out from the sealed container 230 and heated in an oven, for solidifying the first insulation layer 150. When the first insulation layer 150 is solidified, the first top encapsulation mould 210 and the first bottom encapsulation mould 220 may be removed.

Figure 4:
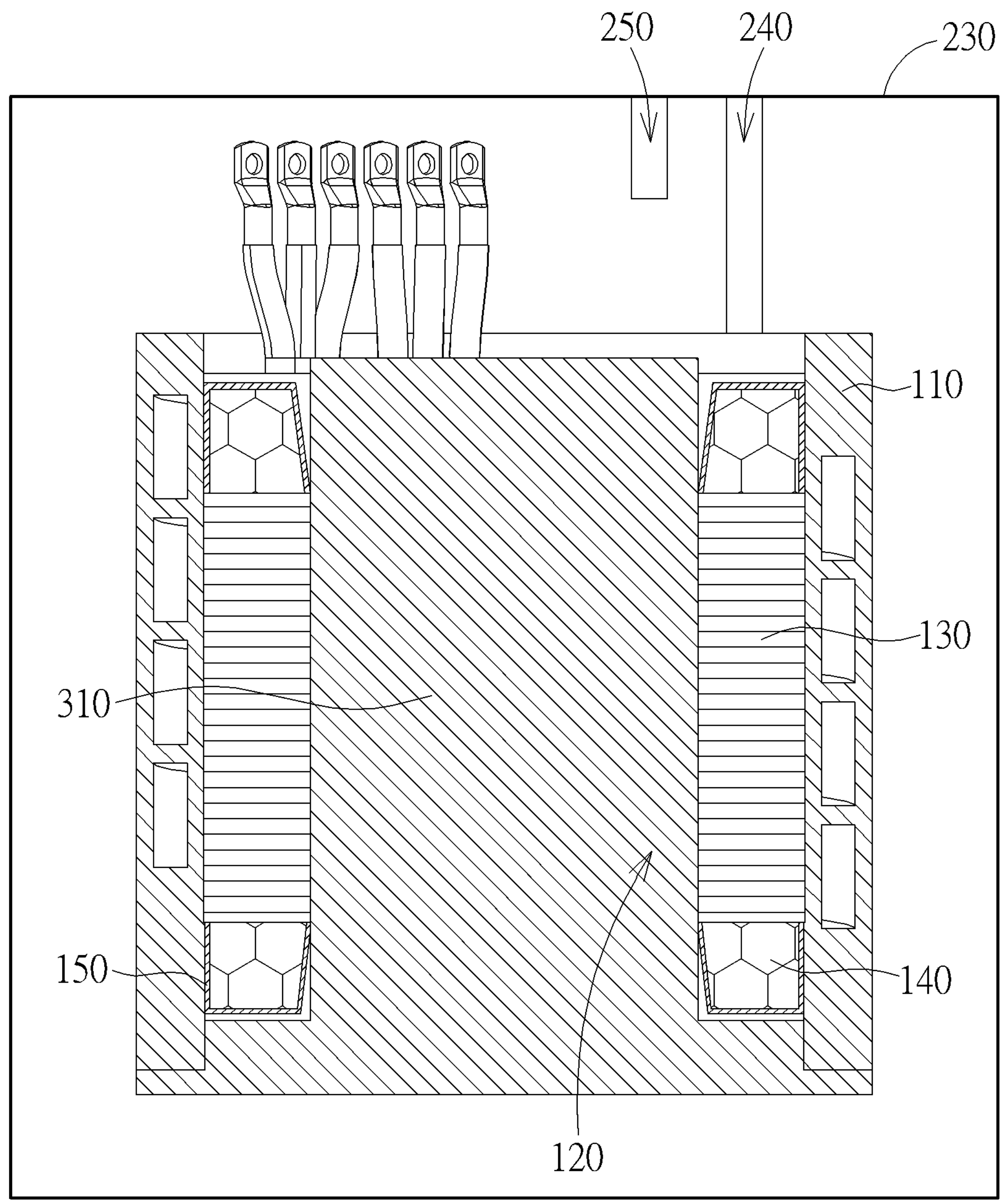
FIG. 4 illustrates a motor stator before covering a second insulation layer by induction motor stator encapsulate method according to one embodiment of the present invention.
Figure 5:
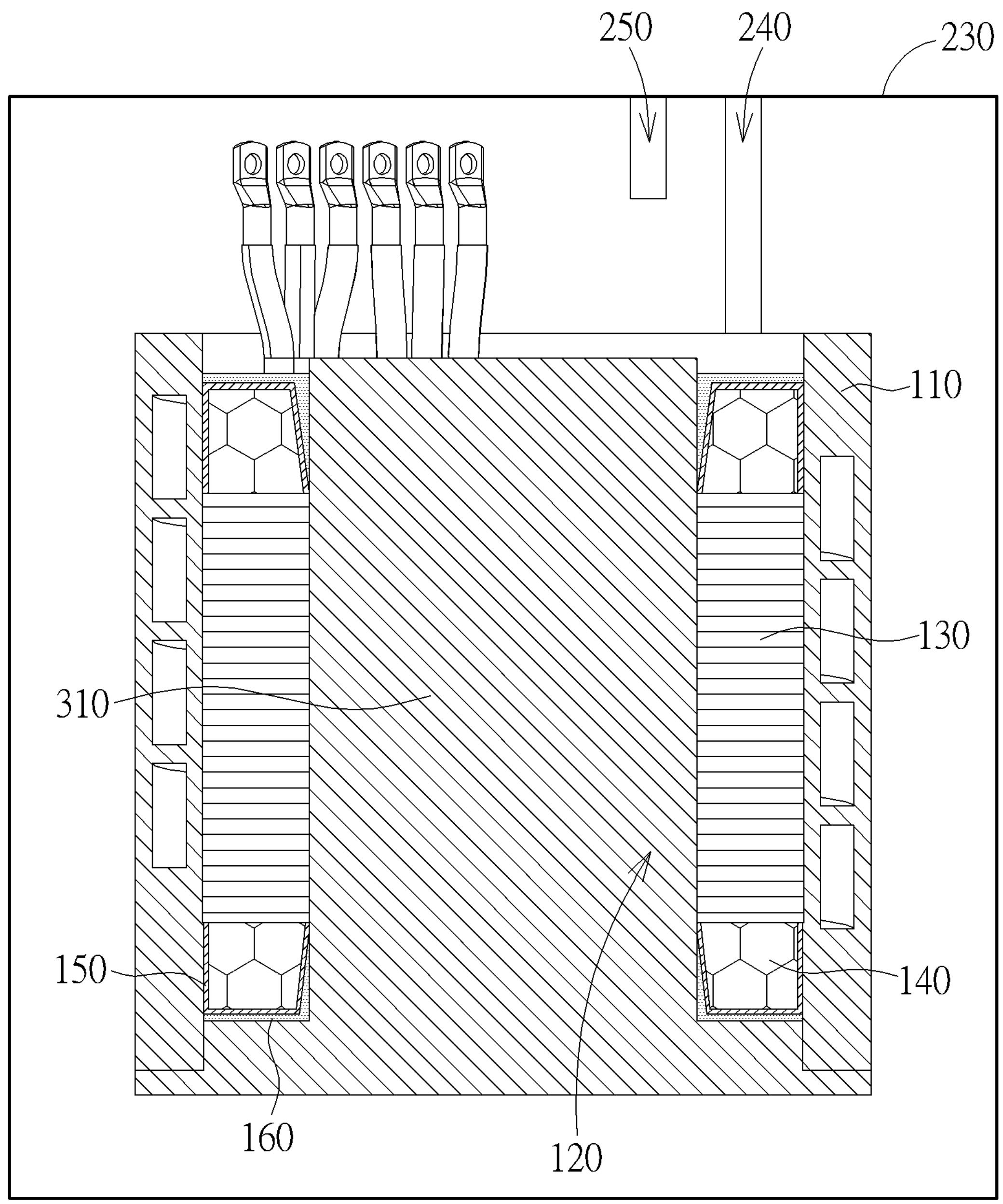
FIG. 5 illustrates a motor stator after covering a second insulation layer by induction motor stator encapsulate method according to one embodiment of the present invention.

FIG. 4 illustrates a motor stator before covering a second insulation layer by induction motor stator encapsulate method according to one embodiment of the present invention, and FIG. 5 illustrates a motor stator after covering a second insulation layer by induction motor stator encapsulate method according to one embodiment of the present invention. As shown, after the first insulation layer 150 is solidified, according to the induction motor stator encapsulate method of the present invention, the second encapsulation mould 310 is arranged inside the stator 120, wherein the stator 120, the case 110 and the second encapsulation mould 310 are put in the sealed container 230. Then, according to the induction motor stator encapsulate method of the present invention, the vacuum pumping system 250 is initiated to pump the sealed container 230 to the vacuum condition through the pumping hole 250, and a second encapsulating material is filled into the case 110 through the filling hole 240 of the sealed container 230. After the second encapsulating material is filled into the case 110, the second encapsulating material is moulded by the second encapsulation mould 310 and directly covers on the first insulation layer 150 for forming a second insulation layer 160. After the second insulation layer 160 is formed, the stator 120, the case 110 and the second encapsulation mould 310 are taken out from the sealed container 230 and heated in the oven, for solidifying the second insulation layer 160. After the second insulation layer 160 is solidified, the second encapsulation mould 310 may be removed.

Figure 6:
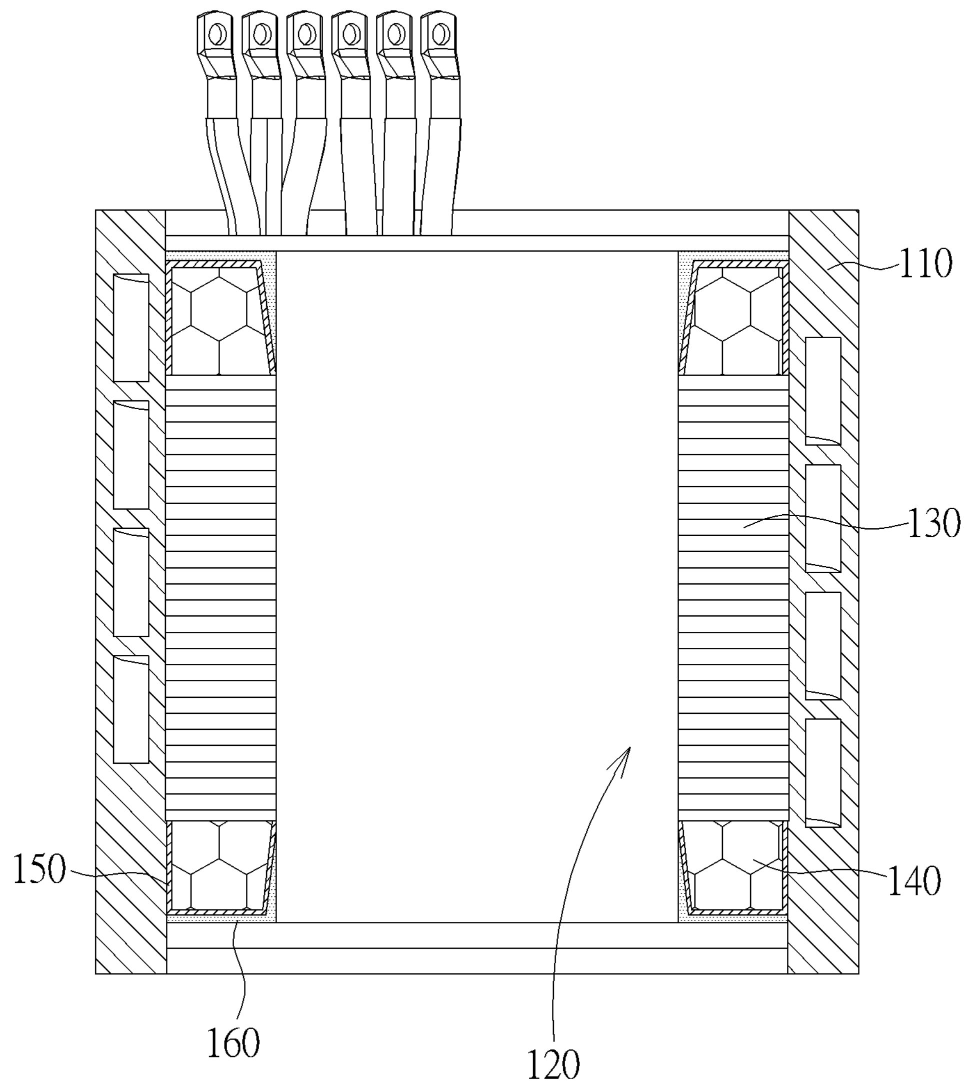
FIG. 6 illustrates a encapsulated induction motor stator according to one embodiment of the present invention.

FIG. 6 illustrates a encapsulated induction motor stator according to one embodiment of the present invention. As shown, a structure of the encapsulated induction motor stator includes the case 110, the stator 120, the first insulation layer 150 and the second insulation layer 160. The first insulation layer 150 is formed by the first encapsulating material and directly covers on the stator winding 140, the second insulation layer 160 is formed by the second encapsulating material and directly covers on the first insulation layer 150. According to the present invention, a shrink rate of the first encapsulating material is smaller than a shrink rate of the second encapsulating material. For example, the first encapsulating material may be silicon (having a shrink rate approximately 0.2%), and the second encapsulating material may be epoxy resin (having a shrink rate approximately 2%). Since the first insulation layer 150 directly covers on the stator winding 140, arranging silicon with a smaller shrink rate to cover on the stator winding 140 may reduce the strain of the contact area between the first insulation layer 150 and the stator winding 140 when solidifying, and further prevents the stator winding 140 from being damaged during solidifying. In addition, since a mechanical strength of epoxy resin is greater than a mechanical strength of silicon, silicon may be protected by solidified epoxy resin from the first insulation layer 150 to avoid cracking and falling off. Furthermore, since a thermal conductivity (2.8 W/mk) of silicon is greater than a thermal conductivity (2.12 W/mk) of epoxy resin, a thermal dissipation effect of the first insulation layer 150 formed by silicon may be improved.

In another aspect, according to the present invention, a volume of the first encapsulating material inside the case 110 is greater than a volume of the second encapsulating material inside the case 110. Preferably, a volume ratio between the first encapsulating material and the second encapsulating material inside the case 110 is approximately 7:3. For a weight of the encapsulating material inside the case 110 directly affects a weight of the induction motor, adopting the encapsulating material with a smaller specific gravity may reduce the weight of the induction motor. For example, if the induction motor uses silicon (having a specific gravity approximately 4.2) as the first encapsulating material and epoxy resin (having a specific gravity approximately 14) as the second encapsulating material while the volume ratio between silicon and epoxy resin is 7:3, 49% weight of the induction motor may be reduced compared to the induction motor entirely using epoxy resin as the insulation layer.

In addition, according to the present invention, in a structure of the induction motor stator encapsulate, a thickness of the second insulation layer 160 is greater than 2 millimeters, and a thickness of the second insulation layer 160 is preferably between 3 to 5 millimeters.

Figure 7:
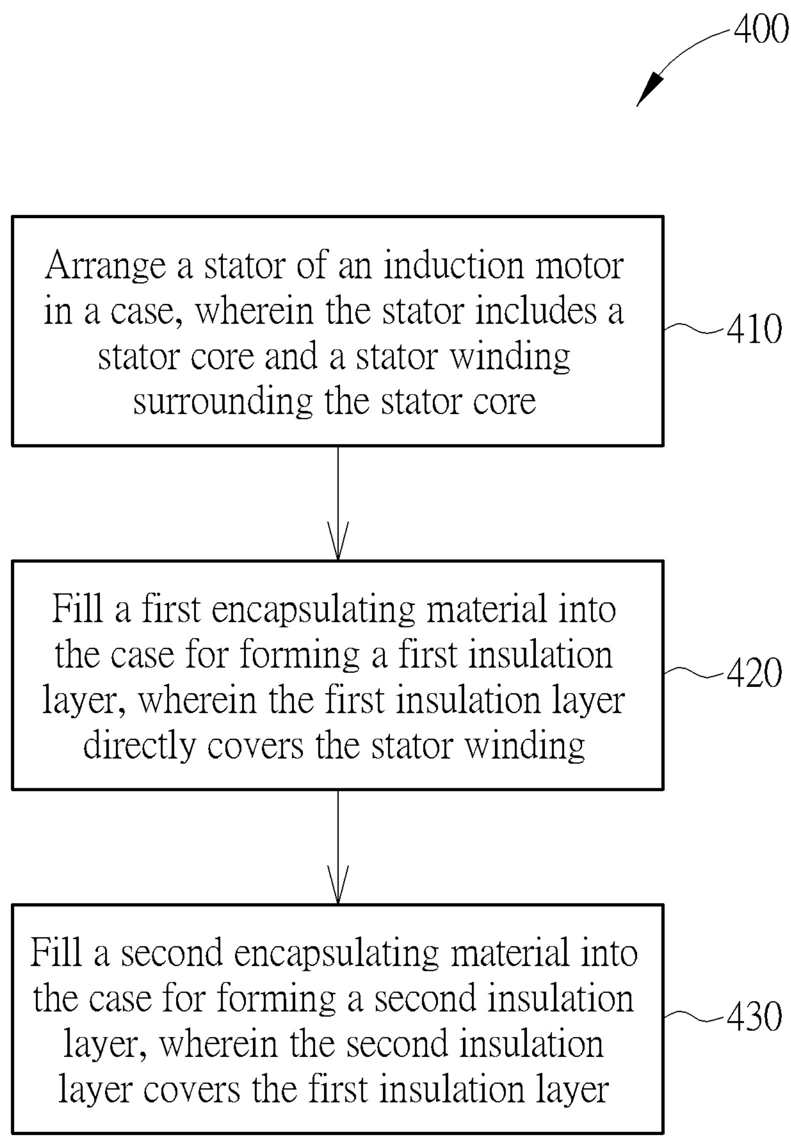
FIG. 7 is a flowchart of an induction motor stator encapsulate method of the present invention

FIG. 7 is a flowchart 400 of an induction motor stator encapsulating method in accordance with the present invention, which may include the following steps:

Step 410: Arrange a stator of an induction motor in a case, wherein the stator includes a stator core and a stator winding surrounding the stator core.

Step 420: Fill a first encapsulating material into the case for forming a first insulation layer, wherein the first insulation layer directly covers the stator winding; and Step 430: Fill a second encapsulating material into the case for forming a second insulation layer, wherein the second insulation layer covers the first insulation layer.

In addition, the induction motor stator encapsulate method of the present invention is not necessary to follow the order of the steps described above and other steps may be interposed between the steps.

The present invention is advantageous over the conventional art because the induction motor stator encapsulate method forms the first insulation layer by the first encapsulating material with a smaller shrink rate. Since the first insulation layer directly covers on the stator winding, the first encapsulating material with a smaller shrink rate may prevent the stator winding from damaging during solidifying. Moreover, a mechanical strength of the second encapsulating material is greater than a mechanical strength of the first encapsulating material according to the present invention. Therefore, the second insulation layer formed by the solidified second encapsulating material may protect the first insulation layer from cracking and falling off during operation. In another aspect, the first encapsulating material possesses a greater thermal conductivity, which may improve the thermal dissipation effect of the stator. Therefore, the induction motor stator encapsulate method of the present invention may improve the thermal dissipation effect and the strength of the encapsulation structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An induction motor stator encapsulate method, comprising:

arranging a stator of an induction motor in a case of the induction motor, wherein the stator comprises a stator core and a stator winding surrounding the stator core;

filling a first encapsulating material into the case for forming a first insulation layer, wherein the first insulation layer directly covers the stator winding; and filling a second encapsulating material into the case for forming a second insulation layer, wherein the second insulation layer covers the first insulation layer;

wherein a shrink rate of the first encapsulating material is smaller than a shrink rate of the second encapsulating material.

2. The induction motor stator encapsulate method of claim 1, wherein the first encapsulating material is silicon.

3. The induction motor stator encapsulate method of claim 2, wherein the second encapsulating material is epoxy resin.

4. The induction motor stator encapsulate method of claim 3, wherein a volume of the first encapsulating material filled in the case is greater than a volume of the second encapsulating material filled in the case.

5. The induction motor stator encapsulate method of claim 1, further comprising:

arranging the stator and the case in a sealed container; and vacuum pumping the sealed container.

6. An induction motor stator encapsulation structure, comprising:

a case;

a stator, arranged in the case, the stator comprising:

a stator core; and a stator winding surrounding the stator core;

a first insulation layer, formed by a first encapsulating material and directly covering the stator winding; and a second insulation layer, formed by a second encapsulating material and covering the first insulation layer;

wherein a shrink rate of the first encapsulating material is smaller than a shrink rate of the second encapsulating material.

7. The induction motor stator encapsulation structure of claim 6, wherein the first encapsulating material is silicon.

8. The induction motor stator encapsulation structure of claim 7, wherein the second encapsulating material is epoxy resin.

9. The induction motor stator encapsulation structure of claim 6, wherein a thickness of the second insulation layer is greater than 2 millimeters.

* * * * *